United States Patent
Huck et al.

(10) Patent No.: US 9,441,750 B2
(45) Date of Patent: Sep. 13, 2016

(54) VALVE CARTRIDGE

(75) Inventors: Kai Huck, Wetter (DE); Paul Johnson, Columbia, MD (US)

(73) Assignee: Grohe AG, Hemer (DE)

( * ) Notice: Subject to any disclaimer, the term of this patent is extended or adjusted under 35 U.S.C. 154(b) by 493 days.

(21) Appl. No.: 13/455,643

(22) Filed: Apr. 25, 2012

(65) Prior Publication Data
US 2012/0279595 A1 Nov. 8, 2012

Related U.S. Application Data

(60) Provisional application No. 61/479,079, filed on Apr. 26, 2011.

(51) Int. Cl.
*F16K 3/08* (2006.01)
*F16K 11/00* (2006.01)
*F16K 27/04* (2006.01)

(52) U.S. Cl.
CPC ........... *F16K 19/006* (2013.01); *F16K 27/045* (2013.01); *Y10T 137/5196* (2015.04); *Y10T 137/7668* (2015.04); *Y10T 137/86549* (2015.04); *Y10T 137/86743* (2015.04);
(Continued)

(58) Field of Classification Search
CPC ...... F16K 11/202; F16K 3/08; F16K 11/076; F16K 11/0743; F16K 11/18; F16K 11/0716; F16K 11/048; F16K 27/045; F16K 19/006; Y10T 137/86823; Y10T 137/86549; Y10T 137/87072; Y10T 137/5196; Y10T 137/86815; Y10T 137/9464; Y10T 137/86743; Y10T 137/87129; Y10T 137/87145; Y10T 137/6017; Y10T 137/6024; Y10T 137/2514; Y10T 137/2521; Y10T 137/7668; Y10T 137/87652; E03C 2201/30

USPC ........ 137/625.41, 625.17, 636.2, 270, 625.4, 137/801, 625.31, 637.3, 637.5, 315.13, 137/315.15, 98, 100, 454.6; 251/160, 209
See application file for complete search history.

(56) References Cited

U.S. PATENT DOCUMENTS

| | | | | |
|---|---|---|---|---|
| 2,847,031 A | * | 8/1958 | Brown, Jr. | 137/637.4 |
| 4,640,457 A | * | 2/1987 | MacDonald | 137/100 |
| 4,901,749 A | * | 2/1990 | Hutto | 137/270 |

(Continued)

FOREIGN PATENT DOCUMENTS

DE 101 33 041 A1 1/2003

OTHER PUBLICATIONS

Machine translation of DE10133041, from Espacenet, Aug. 27, 2014.*

*Primary Examiner* — Craig J Price
(74) *Attorney, Agent, or Firm* — Muncy, Geissler, Olds & Lowe, P.C.

(57) ABSTRACT

In a valve cartridge for a plumbing fixture that comprises a cartridge housing that has one connection opening, each for the inflowing cold and hot water and at least one discharge opening for the outflowing water, a mixing valve with a control element/operating handle for selecting the mixing ratio of cold and hot water, and a rotary valve with a control element/operating handle for selecting the flow rate of water through the valve cartridge, wherein the mixing valve and the rotary valve and/or the control element of the mixing valve and the control element of the rotary valve are arranged in series on an axis of the cartridge housing. The control element of the rotary valve can take the form of a hollow cylinder that is coaxial to the control element of the mixing valve and is attached to the rotary valve in a rotationally fixed manner.

15 Claims, 7 Drawing Sheets

(52) U.S. Cl.
CPC .................. *Y10T 137/86823* (2015.04); *Y10T 137/87652* (2015.04); *Y10T 137/9464* (2015.04)

(56) References Cited

U.S. PATENT DOCUMENTS

| | | | |
|---|---|---|---|
| 5,402,827 A * | 4/1995 | Gonzalez | 137/625.17 |
| 5,681,028 A * | 10/1997 | Cook et al. | 251/170 |
| 5,941,503 A * | 8/1999 | Niakan et al. | 251/214 |
| 6,422,268 B1 * | 7/2002 | Fleig et al. | 137/625.31 |
| 6,981,693 B1 * | 1/2006 | Chang | 137/801 |
| 7,143,786 B2 * | 12/2006 | Romero | 137/606 |
| 7,726,337 B2 * | 6/2010 | Lorch | 137/625.11 |
| 2004/0035943 A1 * | 2/2004 | Bergmann et al. | 236/12.16 |
| 2004/0231735 A1 * | 11/2004 | Haenlein et al. | 137/636.3 |
| 2004/0238650 A1 * | 12/2004 | Luig et al. | 236/12.11 |
| 2005/0017083 A1 * | 1/2005 | Chen | 236/12.1 |
| 2006/0016487 A1 * | 1/2006 | Lin | 137/597 |
| 2007/0267586 A1 * | 11/2007 | Chen | 251/54 |
| 2008/0001112 A1 * | 1/2008 | Chen | 251/284 |
| 2008/0178952 A1 * | 7/2008 | Kacik et al. | 137/625.41 |
| 2008/0216909 A1 * | 9/2008 | Kim | 137/896 |

* cited by examiner

VALVE CARTRIDGE

This nonprovisional application claims priority to U.S. Provisional Application No. 61/479,079, which was filed on Apr. 26, 2011, and which is herein incorporated by reference.

BACKGROUND OF THE INVENTION

1. Field of the Invention

The invention relates to a valve cartridge.

2. Description of the Background Art

A valve cartridge is known from DE 101 33 041 A1. This type of valve cartridge is intended for concealed fixtures. Concealed fixtures are located in a building wall. They have connections to the cold and hot water pipes in the building wall and an opening facing the surface of the wall or plaster. The opening in the concealed fixture serves to accommodate a part of the valve cartridge. The valve cartridge can be produced as a unit at the factory and can be easily installed in and removed from the concealed fixture at the installation site. In the valve cartridge from DE 101 33 041 A1, a rotary valve is located downstream of a thermostatic valve. The rotary valve is operated by means of a rotary handle that drives the driver of the rotary valve via multiple gears and shafts.

SUMMARY OF THE INVENTION

It is therefore an object of the invention to improve a valve cartridge in which two valves are arranged in series. In order to attain the object, the invention provides in an embodiment, a valve cartridge for a plumbing fixture, in particular a concealed fixture, that has a cartridge housing having one connection opening each for the inflowing cold and hot water and at least one discharge opening for the outflowing water. In addition, the valve cartridge includes a mixing valve with a control element/operating handle for selecting the mixing ratio of cold and hot water, and a rotary valve with a control element/operating handle for selecting the flow rate of water through the valve cartridge. The valve cartridge can be provided as a modular unit. It can be preassembled at the factory and placed in a receptacle of the concealed fixture at the installation site. The mixing valve and the rotary valve and/or the control element/operating handle of the mixing valve and the control element/operating handle of the rotary valve are arranged to lie in series on an axis of the cartridge housing in this design. In order to achieve an especially compact construction of the valve cartridge, the control element/operating handle of the rotary valve takes the form of a hollow cylinder that is coaxial to the control element/operating handle of the mixing valve and is attached to the rotary valve in a rotationally fixed manner. Since the control element is attached directly to the rotary valve, it is not necessary to arrange additional drive elements in the valve cartridge. The control element can be provided as a hollow shaft that transmits the torque from the actuation of the control element to the rotary valve. Depending on the dimensions of the hollow shaft and of the cartridge housing, the control element or the hollow shaft may have recesses for the cartridge housing. As a result, the outer dimensions of the valve cartridge can be reduced to a minimum.

An embodiment of the valve cartridge provides for the cartridge housing to comprise a circumferential region and a base. The base, in which the connection openings for cold and hot water and the discharge opening or openings for the outflowing water are provided, is connected in a leakproof manner to the circumferential region of the cartridge housing.

The connecting component for attaching the valve cartridge to a concealed fixture can be provided in the circumferential region of the cartridge housing. The component may be manufactured together with the cartridge housing.

An embodiment of the invention provides for the rotary valve to comprise a valve seat disk held in a rotationally fixed manner in the valve cartridge, a sliding or rotating control disk, and a driver for accommodating the control disk in a rotationally fixed manner. The rotary valve can be provided as a flow control valve, shutoff valve, and/or switchover device for switching between at least two different discharge openings. Advantageously, the rotary valve can be implemented as a multiport valve, wherein, with the rotary valve starting from a shutoff position, the flow to a first consumer, for example a bathtub, is increasingly opened up by a motion of the control element in one direction via the driver and the control disk. If the control element of the rotary valve is moved from this position in the other direction of rotation, first the flow to the first consumer is shut off again, and after the shutoff position is reached, the flow to a second consumer, for example a shower, is increasingly opened up. By reversing the direction of rotation, the rotary valve is moved back to the shutoff position. In order to supply at least two different consumers, at least two openings for the passage of water are provided in the valve seat disk that is held in a rotationally fixed manner, each of which openings stands in connection with the different discharge openings of the valve cartridge or concealed fixture.

An embodiment of the invention also provides that a thermostatic mixing valve, a pressure balanced valve, or a disk control may be provided as the mixing valve. In advantageous fashion, the rotary valve is arranged downstream of the mixing valve in this embodiment. With this arrangement, the base of the valve cartridge can be implemented with the same construction for all mixing valve variants despite different mixing valves. Only the circumferential region of the valve cartridge housing, in which the ports for the inflowing cold and hot water are provided, has to be adapted as necessary to the inlet openings of the different mixing valves.

In an embodiment, the driver of the rotary valve, which serves to accommodate the control disk in a rotationally fixed manner, projects at least partially out of the cartridge housing. As a result, no additional component is required for connecting the driver to the control element of the rotary valve. In advantageous fashion, arranged on the control element are two legs that can be attached to the driver of the rotary valve in an interlocking and/or frictional manner. The control element can thus take the form of a fork drive for the rotary valve. In addition, the driver of the rotary valve can have a receptacle for the legs of the control element/operating handle of the rotary valve that serve as holders for the legs. An embodiment of the invention also provides for the legs of the control element/operating handle to be formed on the hollow cylinder as a single piece. The legs may also be part of the hollow cylinder.

In order to achieve the most compact possible construction for the valve cartridge, the circumference of the control element/operating handle of the rotary valve is made smaller than the circumference of the cartridge housing. In this case, the control element can have cutouts or recesses through which parts of the cartridge housing, for example the mounting lugs, protrude and thus project beyond the control element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
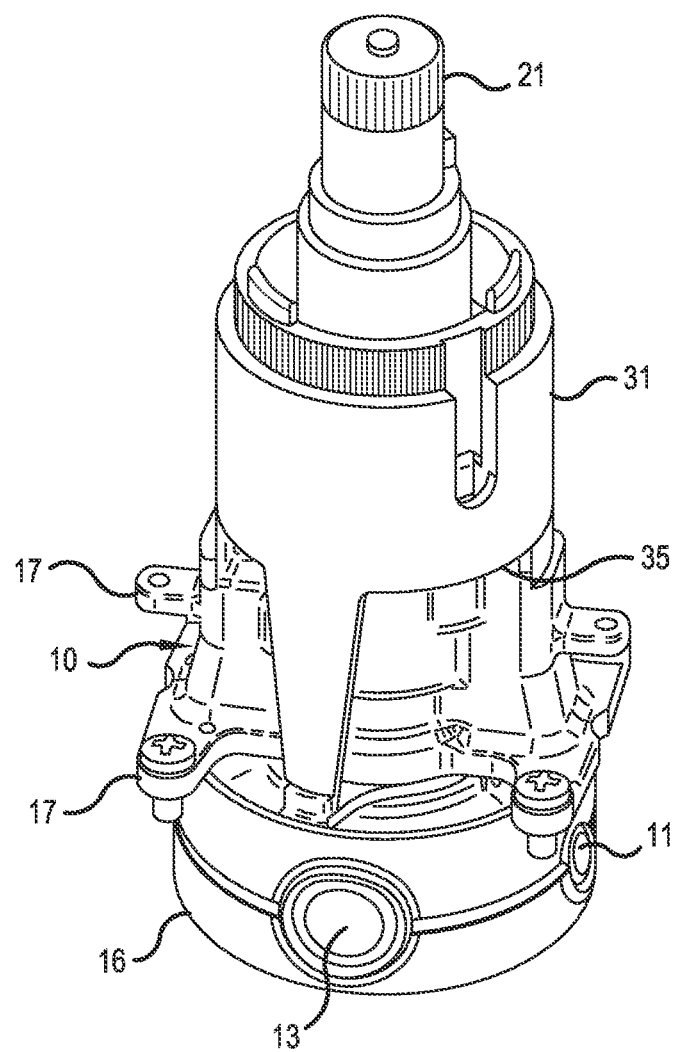
FIG. 1 is a perspective view of a valve cartridge according to the invention.
Figure 2:
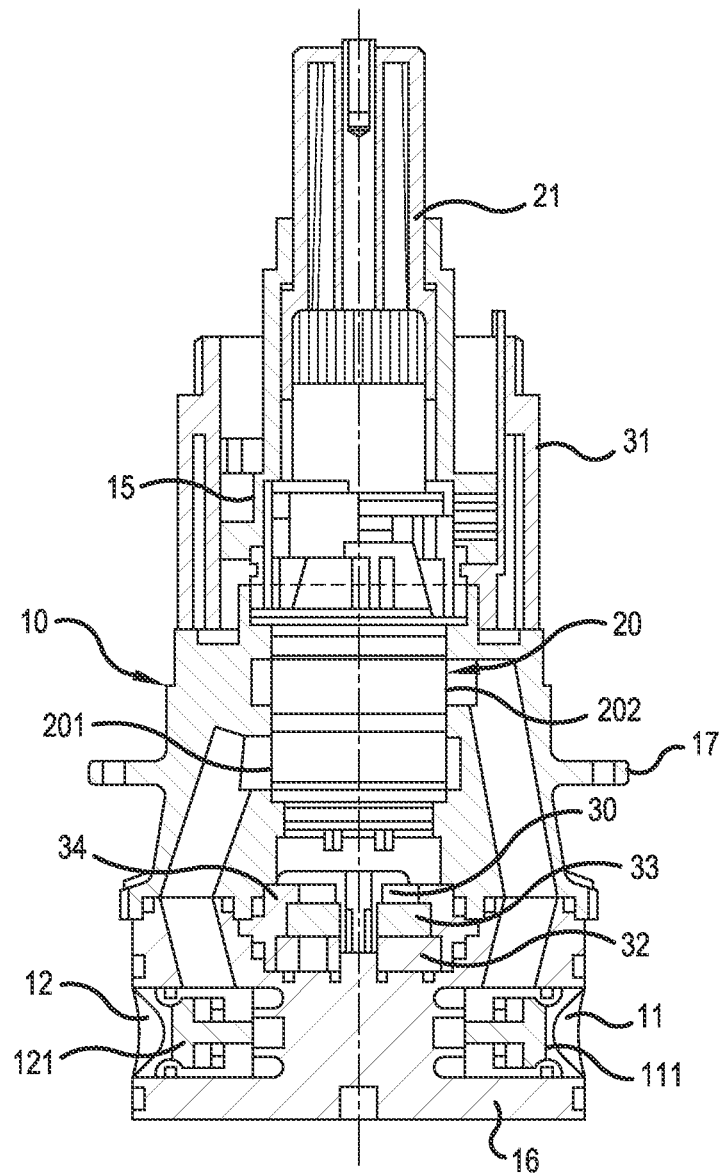
FIG. 2 is a cross-section through the valve cartridge from FIG. 1.

FIG. 1 and FIG. 2 show a valve cartridge according to the invention. The valve cartridge has a cartridge housing 10 with a cylindrical base 16 having two connection openings 11, 12 for cold and hot water and two discharge openings 13, 14 for outflowing mixed water. Check valves 111, 121 are placed in each of the connection openings 11, 12. In addition, the cartridge housing 10 includes a circumferential region 15 in which a connecting component 17 in the form of lugs for mounting the valve cartridge in a concealed fixture (not shown) are formed, among other things. Located in the valve cartridge are a mixing valve 20 and a rotary valve 30. The mixing valve 20, with which the temperature of the outflowing water can be preselected, is operated by means of a control element 21. An additional control element 31 is provided for operating the rotary valve 30, which serves as a flow control and reversing valve.

It is evident from FIG. 2 that the rotary valve 30 comprises a fixed valve seat disk 32, a rotatable control disk 33, and a driver 34 that accommodates the control disk 33 and can be moved and rotated by means of the control element 31. The driver 34 projects past the circumferential region 15 of the cartridge housing 10 at the top edge of the base 16. The control element 31, which, in the region where it projects past a wall opening in which the concealed fixture is located (not shown), is cylindrical in shape and has interfaces to an operating handle, has recesses that are matched to the cartridge housing 10. In the regions in the circumferential region 15 of the cartridge housing 10 where the openings or water-carrying channels extend from the connection openings 11, 12 to the inlet openings 201, 202 of the mixing valve 20, and which thus have a larger circumference than the other regions, the control element 31 is adapted accordingly. The control element 31 is reduced to two legs 311, which can be moved back and forth between the larger circumferential regions of the cartridge housing 10. As shown in FIG. 1, the legs 311 extend it a bottom edge 35 of the control element 31 in an axial direction of the cartridge housing 10.

Figure 3:
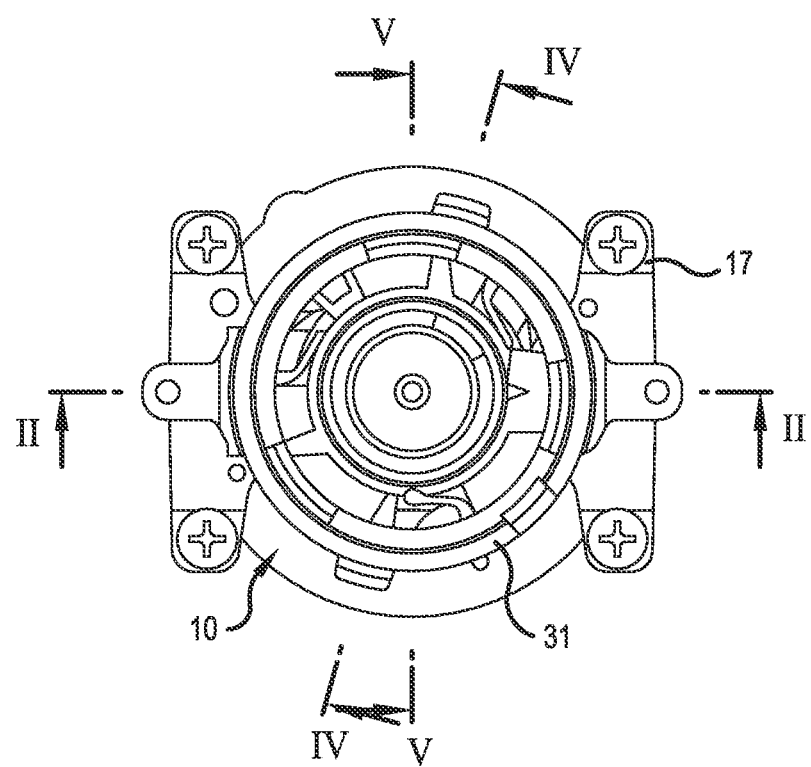
FIG. 3 is a top view of the valve cartridge from FIG. 1.

FIG. 3 shows a top view of the valve cartridge according to the invention. The section lines for FIGS. 2, 4, and 5 are labeled with corresponding Roman numerals.

Figure 4:
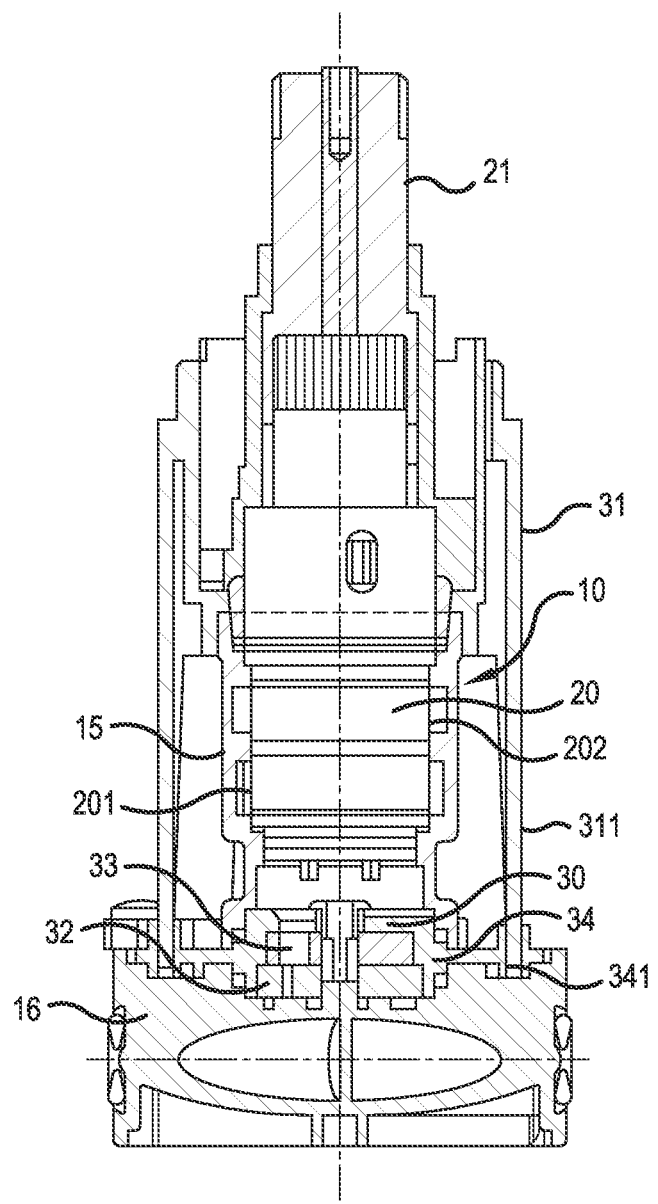
FIG. 4 is a cross-section through the valve cartridge from FIG. 2 along the line IV-IV.

FIG. 4 shows a cross-section through the valve cartridge from FIG. 2 along the line IV-IV. The circumferential region 15 of the cartridge housing 10 has the smallest circumference here. The control element 31 for the rotary valve 30 is arranged to be coaxial to the control element 21 of the mixing valve 20 and coaxial to the mixing valve 20 itself.

Figure 5:
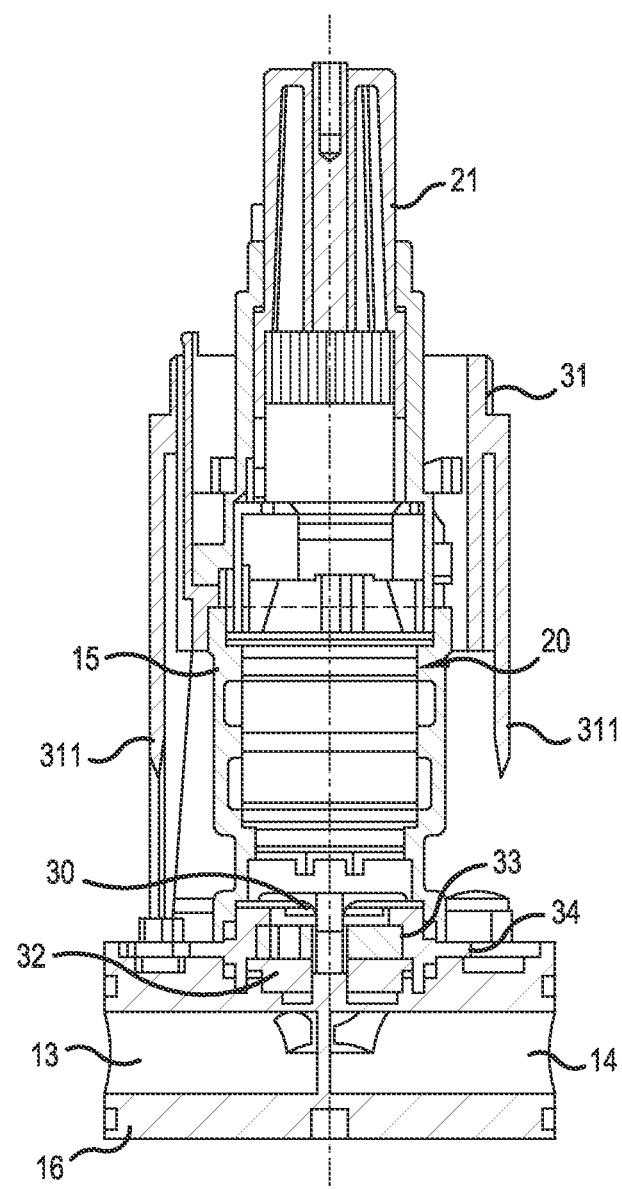
FIG. 5 is a cross-section through the valve cartridge from FIG. 2 along the line V-V.

It is clear from FIG. 5 that the control element 31 has recesses in the region facing the base 16 so that the control element 31 is reduced to the two legs 311. The ends of the legs 311 of the control element 31 engage in recesses 341 of the driver 34 and are attached thereto in a rotationally fixed manner. When the control element 31 is operated, the control disk 33 of the rotary valve 30 can be twisted in two different directions by means of the driver 34. Depending on the positioning of the openings for the passage of water in the control disk 33 and the valve seat disk 32, the one or the other of the two discharge openings 13, 14 is activated for different consumers. As a function of the degree of overlap of the corresponding openings for the passage of water, the quantity of outflowing water is also regulated in the process.

Figure 6:
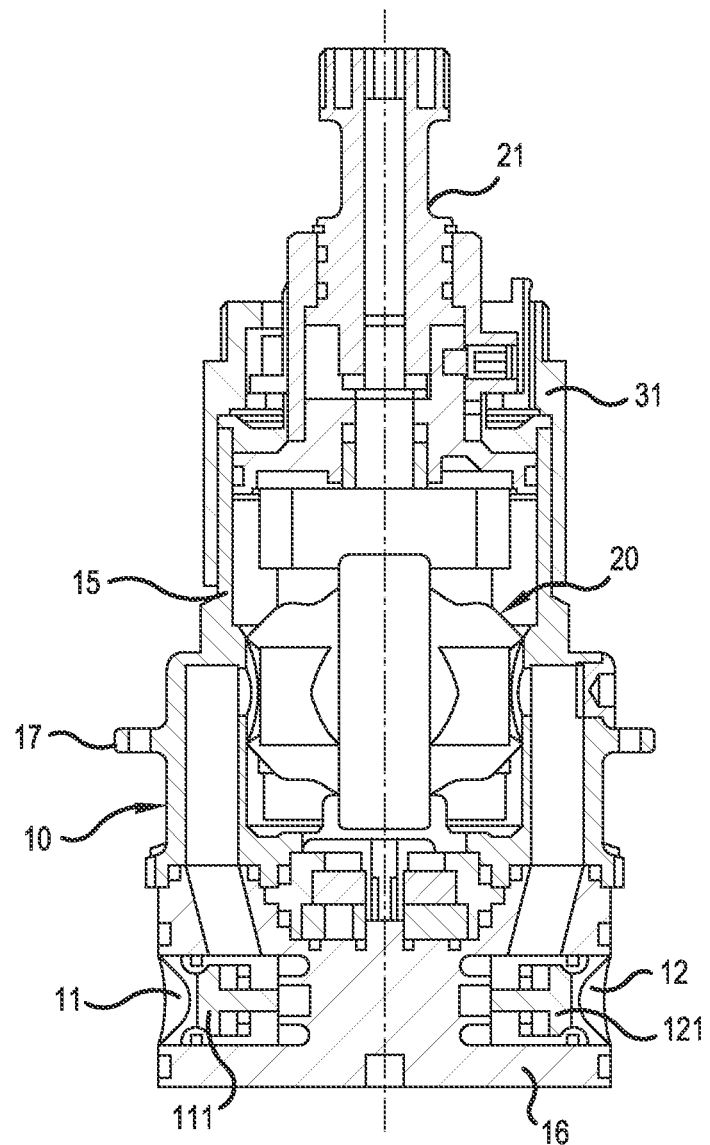
FIG. 6 is a cross-section through a valve cartridge according to the invention with a mixing valve in the form of a pressure balanced valve (PBV)

FIG. 6 shows a valve cartridge according to the invention with an alternative mixing valve 20. This mixing valve is implemented as a pressure balanced valve or PBV. The openings in the cartridge housing 10 of the valve cartridge are implemented in a similar form as in the thermostatic mixing valve 20 in FIGS. 2 through 5. The channels for the inflowing cold and hot water are matched to the dimensions of the mixing valves 20 in each case. The outer dimensions of the base 16 and of the control elements 21, 31 or their interfaces for the visible operating handles are identical for all variants of mixing valves 20.

Figure 7:
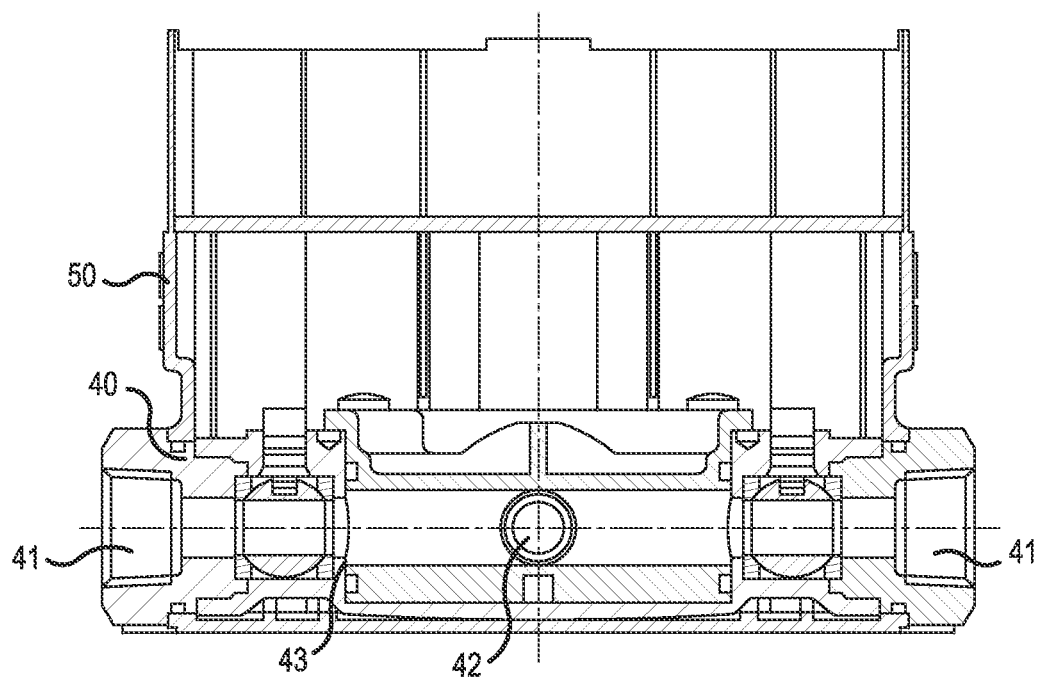
FIG. 7 is a cross-section through a plumbing fixture with a partial cross-section through a valve cartridge according to the invention.

Shown in FIG. 7 is a cross-section through a corresponding concealed fixture 40, in which a valve cartridge according to the invention is placed. The concealed fixture 40 has inlet openings 41, which correspond to the applicable connection openings 11, 12 on the valve cartridge. The discharge openings for mixed water 13, 14 correspond accordingly to the discharge openings 42 of the concealed fixture 40 for the applicable consumer. In the region of its inlet openings 41 and discharge openings 42, the concealed fixture is connected to the water pipes routed in the wall (not shown).

Moreover, located on the side of the concealed fixture 40 facing a wall opening is a concealed box 50, which is connected in a leakproof manner to the concealed fixture 40, and whose height can be matched to the installed depth in the wall of the concealed fixture 40. The valve cartridge according to the invention is placed in a receptacle opening 43 of the concealed fixture 40. The applicable connection openings 11, 12, 13, 14 are each sealed with respect to the concealed fixture 40 by means of sealing elements.

The concealed fixture 40, which has two discharge openings 42 for two consumers, can be connected to a shower head and a tub inlet, for example. Moreover, valve cartridges with different versions of mixing valves can be placed as desired in the receptacle opening 43 provided for this purpose.

With the valve cartridge according to the invention, it is possible to manufacture two valves, which are connected axially in series, with very small dimensions. As a result of the fact that the control element 31 has no additional drive elements for operating the rotary valve 30, but instead the drive elements are part of the control element 31, the outer circumference of the valve cartridge is reduced to a minimum.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A valve cartridge for a plumbing fixture, the valve cartridge comprising:
   a cartridge housing that has one connection opening each for inflowing cold and hot water and at least one discharge opening for outflowing water;
   a mixing valve with a control element/operating handle for selecting a mixing ratio of cold and hot water; and
   a rotary valve with a control element/operating handle for selecting a flow rate of water through the valve cartridge,
   wherein the mixing valve and the rotary valve and/or the control element/operating handle of the mixing valve and the control element/operating handle of the rotary valve are arranged to lie in series on an axis of the cartridge housing,
   wherein the control element/operating handle of the rotary valve is configured as a hollow cylinder that is coaxial to the control element/operating handle of the mixing valve and is attached to the rotary valve in a rotationally fixed manner,
   wherein the control element/operating handle of the rotary valve includes legs and is connected to a driver of the rotary valve via the legs,
   wherein the legs of the control element/operating handle are formed on the hollow cylinder as a single, integral piece, and
   wherein the legs of the control element/operating handle of the rotary valve extend past a bottom edge of the control element/operating handle of the rotary valve in an axial direction of the cartridge housing, the legs extending over and overlapping with an axially extending exterior surface of the cartridge housing, such that the legs are positioned outside of the cartridge housing.

2. The valve cartridge according to claim 1, wherein the cartridge housing comprises a circumferential region and a base.

3. The valve cartridge according to claim 2, wherein a connecting component for attaching the valve cartridge to a concealed fixture is provided in the circumferential region of the cartridge housing.

4. The valve cartridge according to claim 2, wherein the connection openings for cold and hot water and the discharge opening or openings for the outflowing water are provided in the base of the cartridge housing.

5. The valve cartridge according to claim 1, wherein the rotary valve comprises a valve seat disk held in a rotationally fixed manner in the valve cartridge, a sliding or rotating control disk, and the driver for accommodating the control disk in a rotationally fixed manner.

6. The valve cartridge according to claim 1, wherein the at least one discharge opening for outflowing water is at least two discharge openings and wherein the rotary valve is a flow control valve, shutoff valve, and/or switchover device for switching between the at least two discharge openings.

7. The valve cartridge according to claim 1, wherein the mixing valve is a thermostatic mixing valve, a pressure balanced valve, or a disk control.

8. The valve cartridge according to claim 1, wherein the rotary valve is arranged downstream of the mixing valve.

9. The valve cartridge according to claim 1, wherein the connection openings for cold and hot water of the cartridge housing each stand in connection with corresponding inlets of the mixing valve.

10. The valve cartridge according to claim 1, wherein the mixing valve has a discharge opening for the outflowing water that stands in connection with an inlet opening of the rotary valve.

11. The valve cartridge according to claim 5, wherein the driver of the rotary valve, which is configured to accommodate the control disk in a rotationally fixed manner, projects at least partially out of the cartridge housing.

12. The valve cartridge according to claim 1, wherein the driver of the rotary valve has a receptacle for the legs of the control element/operating handle of the rotary valve.

13. The valve cartridge according to claim 1, wherein a circumference of the control element/operating handle of the rotary valve is smaller than a maximum circumference of the cartridge housing.

14. The valve cartridge according to claim 5, wherein the control element/operating handle of the rotary valve is discrete from the valve seat disk, the sliding or rotating control disk and the driver.

15. The valve cartridge according to claim 1, wherein the control element/operating handle of the rotary valve is discrete from the driver.

* * * * *